United States Patent

Sasaki et al.

[11] Patent Number: 6,077,875
[45] Date of Patent: Jun. 20, 2000

[54] FOAMED AND EXPANDED BEADS OF POLYPROPYLENE RESIN FOR MOLDING

[75] Inventors: Hidehiro Sasaki, Kawachi-gun; Masakazu Sakaguchi, Kanuma; Mitsuhiro Akiyama; Hisao Tokoro, both of Utsunomiya, all of Japan

[73] Assignee: JSP Corporation, Tokyo, Japan

[21] Appl. No.: 09/274,345

[22] Filed: Mar. 23, 1999

[30] Foreign Application Priority Data

Mar. 23, 1998 [JP] Japan .................................. 10-093946

[51] Int. Cl.[7] .............................. C08J 9/22; C08J 9/228; C08J 9/232
[52] U.S. Cl. .................................. 521/60; 521/56; 521/143
[58] Field of Search .................................. 521/60, 143, 56

[56] References Cited

U.S. PATENT DOCUMENTS

| | | |
|---|---|---|
| Re. 32,780 | 11/1988 | Yoshimura et al. . |
| 4,379,859 | 4/1983 | Hirosawa et al. . |
| 4,436,840 | 3/1984 | Akiyama et al. . |
| 4,440,703 | 4/1984 | Akiyama et al. . |
| 4,443,393 | 4/1984 | Akiyama et al. . |
| 4,464,484 | 8/1984 | Yoshimura et al. . |
| 4,504,534 | 3/1985 | Adachi et al. . |
| 4,504,601 | 3/1985 | Kuwabara et al. . |
| 4,567,208 | 1/1986 | Kuwabara et al. . |
| 4,568,608 | 2/1986 | Kuwabara et al. . |
| 4,587,270 | 5/1986 | Kuwabara et al. . |
| 4,598,001 | 7/1986 | Watanabe et al. . |
| 4,602,082 | 7/1986 | Akiyama et al. . |
| 4,676,939 | 6/1987 | Kuwabara . |
| 4,689,351 | 8/1987 | Endo et al. ........................... 521/60 |
| 4,692,507 | 9/1987 | Akiyama et al. . |
| 4,695,593 | 9/1987 | Kuwabara et al. ................... 521/60 |
| 4,704,239 | 11/1987 | Yoshimura et al. . |
| 4,711,287 | 12/1987 | Kuwabara et al. . |
| 4,716,021 | 12/1987 | Akiyama et al. . |
| 4,749,725 | 6/1988 | Akiyama et al. . |
| 4,756,948 | 7/1988 | Kuramochi et al. . |
| 4,777,000 | 10/1988 | Kuwabara et al. ................... 521/60 |
| 4,822,542 | 4/1989 | Kuwabara et al. . |
| 4,840,973 | 6/1989 | Kuwabara et al. . |
| 4,889,671 | 12/1989 | Akiyama et al. . |
| 4,948,817 | 8/1990 | Kuwabara et al. . |
| 5,032,620 | 7/1991 | Arai et al. ........................... 521/60 |
| 5,053,435 | 10/1991 | Kuwabara et al. . |
| 5,071,883 | 12/1991 | Kuwabara et al. . |
| 5,084,814 | 1/1992 | Vaglica et al. . |
| 5,122,545 | 6/1992 | Kuwabara et al. ................... 521/60 |
| 5,130,341 | 7/1992 | Kuwabara et al. . |
| 5,284,431 | 2/1994 | Kuwabara et al. . |
| 5,340,841 | 8/1994 | Tokoro et al. . |
| 5,391,581 | 2/1995 | Kuwabara et al. . |
| 5,459,169 | 10/1995 | Tokoro et al. . |
| 5,468,781 | 11/1995 | Sugano et al. ........................ 521/60 |
| 5,569,681 | 10/1996 | Tokoro et al. . |
| 5,622,756 | 4/1997 | Tokoro et al. . |
| 5,651,912 | 7/1997 | Mitsumoto et al. . |
| 5,679,450 | 10/1997 | Tokoro et al. . |
| 5,747,549 | 5/1998 | Tsurugai et al. . |

Primary Examiner—Morton Foelak

[57] ABSTRACT

Disclosed herein are foamed and expanded beads of a polypropylene resin for molding, which comprise an uncrosslinked propylene random copolymer having a melting point of at least 140° C. as a base resin, wherein the time required to attenuate an air pressure within the foamed beads applied by a pressurizing treatment with air from 1.2 kgf/cm²(G) to 0.8 kgf/cm²(G) under atmospheric pressure at 23° C. is at least 80 minutes, and the CNI value of the foamed beads, which is defined by the following equation (1):

$$CNI = \log_{10}[Pw \times Er \div (2.24 \times D^3 \times B)] \qquad (1)$$

wherein Pw is an average weight (mg) per foamed bead, Er is a bulk expansion ratio (time) of the foamed beads, D is a cell diameter (mm) of the foamed beads, and B is a density of the base resin, is smaller than 3.80.

14 Claims, 2 Drawing Sheets

FOAMED AND EXPANDED BEADS OF POLYPROPYLENE RESIN FOR MOLDING

BACKGROUND OF THE INVENTION

1. Field of the Invention

The present invention relates to foamed and expanded beads of a polypropylene resin for molding.

2. Description of the Background Art

Polypropylene resin foams are widely used as packaging materials, building materials, insulating materials and the like because they are excellent in properties such as mechanical strength and cushioning properties. As methods for producing polypropylene resin foams, there have been known methods such as a foam extrusion method and an expansion molding method. Of these, the foam extrusion method is a method suitable for continuously providing lengthy foams. However, only lengthy foams the shape in a section perpendicular to the extrusion direction of which are always the same, such as plate-like foams, columnar or prismatic foams, or those having projections along the extrusion direction on the surfaces of these foams, can be produced by this extrusion method. It is hence difficult to provide foams having a complicated shape. On the other hand, the expansion molding method is a method in which foamed and expanded beads (hereinafter referred to as "foamed beads" merely) of a polypropylene resin are filled into a mold and heated with steam to fusion-bond them to one another, thereby obtaining an expansion-molded article (hereinafter referred to as "molded foam") conforming to the mold. Therefore, a molded foam having an optional shape can be obtained according to the shape of the internal surface of a mold so far as it can be released from the mold. For this reason, the expansion molding method is widely used for the production of molded foams of various shapes.

In the expansion molding method, it is necessary for foamed beads filled in a mold to expand upon heating them so as to fill in voids among the beads (interbead voids), and moreover to surely fusion-bond to one another. Therefore, it is necessary to impart expandability to the foamed beads to be filled into the mold in order that the foamed beads can be expanded by heating. There is thus adopted a method in which the expandability is imparted to the foamed beads by compressing them into the volume smaller than that before their filling into the mold, and the compressed beads are then filled into the mold, or a method in which the expandability is imparted to the foamed beads by subjecting them to a pressurizing treatment with air or the like prior to their filling into the mold to increase the internal pressure thereof.

Of these methods, the expansion molding method making use of the foamed beads the internal pressure of which has been increased is preferred as a method for providing molded foams having a higher expansion ratio compared with the expansion molding method making use of the compressed foamed beads.

In recent years, there has however been a demand for provision of foams higher in mechanical properties such as compressive strength with the spread of polypropylene resin foams. In order to meet such a demand, a polypropylene resin having a higher melting point has come to be used as a base resin of foamed beads. When foamed beads of an uncrosslinked polypropylene resin, which are preferred in that they can be recycled, are used to conduct molding, however, it is impossible to provide a superb molded foam excellent in the fusion-bonded state of the foamed beads and little in interbead voids unless the pressure (temperature) of super heated steam (hereinafter referred to as "steam" merely) for molding as a heating medium is more raised as the melting point of the base resin is higher if the kind of the resin and the expansion ratio of the foamed beads are the same. In the foamed beads of the uncrosslinked polypropylene resin having a higher melting point, it is hence necessary to mold them using higher-pressure steam. As a result, such foamed beads have involved a problem that energy cost is increased, and moreover the molding cycle is lengthened, resulting in lowering of productivity.

SUMMARY OF THE INVENTION

The present invention has been made with the foregoing circumstances in view and has as its object the provision of foamed beads of a polypropylene resin for molding, which are foamed beads using, as a base resin, an uncrosslinked polypropylene resin having a melting point as high as at least 140° C., but permit the provision of excellent molded foams as before even when they are heated with lower-pressure steam compared with the conventional foamed beads comprising, as a base resin, an uncrosslinked polypropylene resin having the same melting point.

In an aspect of the present invention, there are thus provided foamed beads of a polypropylene resin for molding, which comprise an uncrosslinked propylene random copolymer having a melting point of at least 140° C. as a base resin, wherein the time required to attenuate an air pressure within the foamed beads applied by a pressurizing treatment with air from 1.2 kgf/cm$^2$(G) to 0.8 kgf/cm$^2$(G) under atmospheric pressure at 23° C. is at least 80 minutes, and the CNI value of the foamed beads, which is defined by the following equation (1):

$$CNI = \log_{10}[Pw \times Er \div (2.24 \times D^3 \times B)] \qquad (1)$$

wherein Pw is an average weight (mg) per foamed bead, Er is a bulk expansion ratio (time) of the foamed beads, D is a cell diameter (mm) of the foamed beads, and B is a density of the base resin, is smaller than 3.80.

In the present invention, "(G)" in the unit, kgf/cm$^2$(G), of the pressure means that the pressure is a gauge pressure.

In the foamed beads according to the present invention, the CNI value of the foamed beads may preferably be 2.00 to 3.60. The uncrosslinked propylene random copolymer, which is the base resin of the foamed beads, may preferably be a propylene random copolymer containing another comonomer component than propylene in a proportion of 0.05 to 15 wt. %. It may also be preferred that the melting point of the uncrosslinked polypropylene resin, which is the base resin of the foamed beads, be at least 140° C. but at most 160° C., and the melt flow rate thereof be 0.5 to 12 g/10 min. Further, it may be preferred that the average weight of the foamed beads be at least 0.2 mg but at most 1.1 mg per foamed bead, and the bulk expansion ratio thereof be 40 to 80 times. Still further, it may be preferred that on a DSC curve obtained by the differential scanning calorimetry of the foamed beads, a high-temperature peak should appear on the temperature side higher than a temperature at which an inherent peak corresponding to the heat of fusion of the base resin of the foamed beads appears, and the quantity of heat at the high-temperature peak be not lower than 10 J/g but lower than 15 J/g.

In a preferred aspect of the present invention, there are also provided foamed beads of a polypropylene resin for molding, which comprise an uncrosslinked propylene random copolymer having a melting point of at least 140° C. as a base resin, wherein the time required to attenuate an air pressure within the foamed beads applied by a pressurizing treatment with air from 1.2 kgf/cm²(G) to 0.8 kgf/cm²(G) under atmospheric pressure at 23° C. is at least 80 minutes, the CNI value of the foamed beads is 2.00 to 3.60, and the foamed beads have an average weight of at least 0.2 mg but at most 1.1 mg per foamed bead and a bulk expansion ratio of 40 to 80 times, and wherein on a DSC curve obtained by the differential scanning calorimetry of the foamed beads, a high-temperature peak appears on the temperature side higher than a temperature at which an inherent peak corresponding to the heat of fusion of the base resin of the foamed beads appears, and the quantity of heat at the high-temperature peak is not lower than 10 J/g but lower than 15 J/g.

The above and other objects, features and advantages of the present invention will be readily appreciated as the same becomes better understood from the preferred embodiments of the present invention, which will be described subsequently in detail with reference to the accompanying drawings, and from the appended claims.

DETAILED DESCRIPTION OF THE PREFERRED EMBODIMENTS

Figure 1:
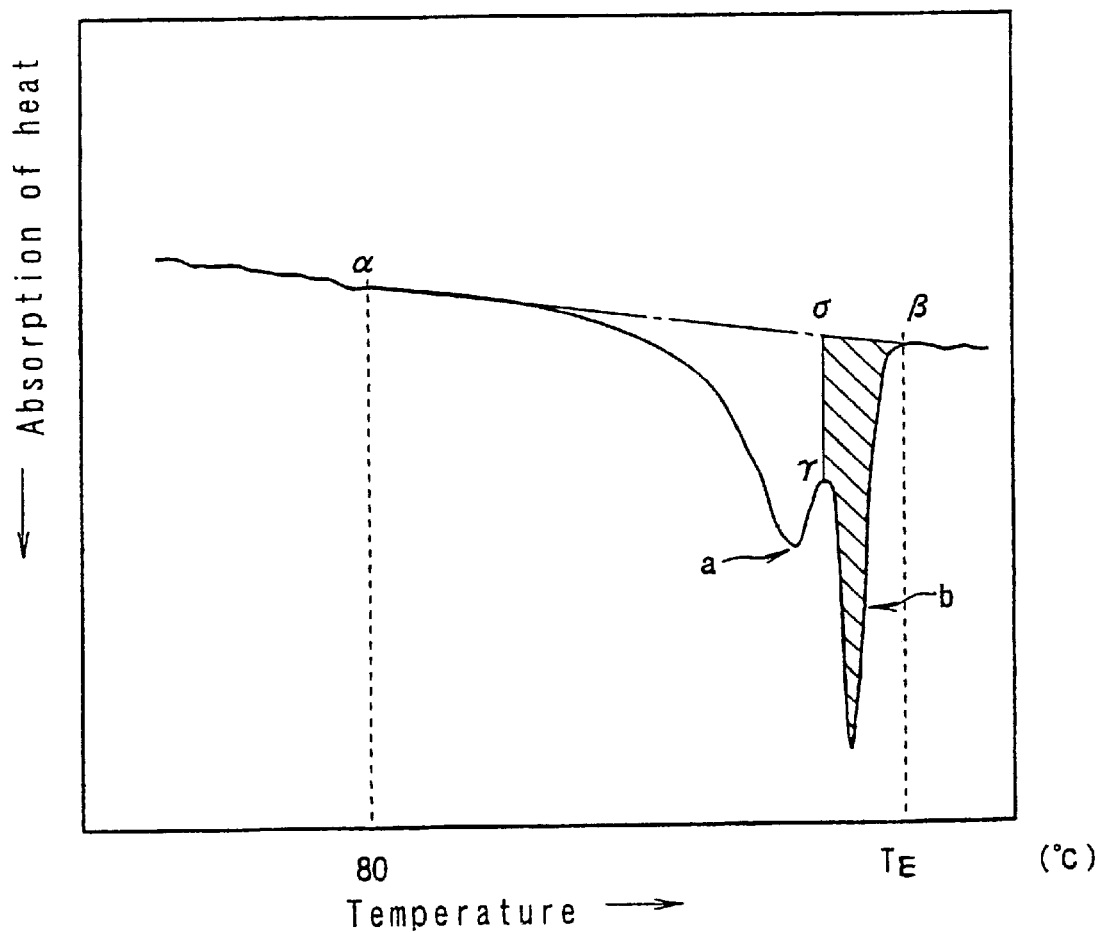
FIG. 1 shows an illustrative chart of a first DSC curve of foamed beads of a polypropylene resin for molding according to the present invention.

The base resin of the foamed beads according to the present invention is an uncrosslinked propylene random copolymer. Examples of another comonomer copolymerized with propylene include α-olefins such as ethylene, 1-butene, 1-pentene and 1-hexene other than propylene. The propylene random copolymer may be either a bipolymer such as a propylene-ethylene random copolymer or propylene-butene random copolymer, or a terpolymer such as a propylene-ethylene-butene copolymer. A proportion of the other comonomer component than propylene in the copolymer is preferably 0.05 to 15 wt. %, particularly, 0.1 to 10 wt. %. If the proportion of the comonomer component is lower than 0.05 wt. %, the properties, such as cold resistance, of the resulting molded foam, are deteriorated. On the other hand, any proportion exceeding 15 wt. % results in a copolymer hard to have a melting point of at least 140° C. As a result, there is a possibility that the heat resistance, and mechanical properties, such as compressive strength, of the resulting molded foam may be deteriorated.

Although the foamed beads according to the present invention require that the base resin thereof should have a melting point of at least 140° C., the melting point is preferably at most 160° C., particularly, 141 to 155° C. in view of the productivity upon the molding of the foamed beads, the cost of equipment, and the like. Further, the propylene random copolymer, which is the base resin of the foamed beads, preferably has a melt flow rate (hereinafter abbreviated as "MFR") of 0.5 to 12 g/10 min, particularly 4 to 10 g/10 min in view of the heat resistance of the resulting molded foam, and expansion efficiency upon the production of the foamed beads. Incidentally, the MFR is a value obtained by measurement under Test Conditions 14 prescribed in JIS K 7210.

The foamed beads according to the present invention are such that the CNI value represented by the equation (1) is smaller than 3.80. In the equation (1), the average weight, Pw per foamed bead is a value determined by measuring the total weight of 10 foamed beads selected at random and dividing the total weight by the number of the foamed beads (i.e. 10). The cell diameter, D of the foamed beads means an average diameter of cells present in the foamed beads. More specifically, each of foamed beads selected at random was cut at its substantial center to count the number, N of cells present on a straight line of an optional length, L drawn from an optional cell wall to another optional cell wall on an image or microphotograph of its section taken through a microscope, thereby finding an average cell diameter, D' of each foamed bead in accordance with the following equation (2). However, the straight line is drawn in such a manner that the starting point and end point of the straight line are determined to be an optional cell wall and another optional cell wall, and at least 10 cells are present between them.

$$D'=1.62\times(L\div N) \qquad (2)$$

The above-described process was conducted on 3 foamed beads in total, and the total average diameter, D' of the these foamed beads are arithmetically averaged, thereby calculating out the cell diameter, D of the foamed beads.

As the bulk expansion ratio, Er of the foamed beads in the equation (1), for convenience' sake, there is adopted a value obtained by multiplying an apparent expansion ratio of the foamed beads based on the measurement, which will be described subsequently by 1.6. In the present invention, the density, B of the base resin is determined to be 0.9 g/cm³ for convenience' sake.

The foamed beads according to the present invention are such that the CNI value is smaller than 3.80, and moreover the time (hereinafter referred to as "internal pressure attenuation time" merely) required to attenuate an air pressure within the foamed beads applied by a pressurizing treatment with air from 1.2 kgf/cm²(G) to 0.8 kgf/cm²(G) under atmospheric pressure at 23° C. is at least 80 minutes. In order to measure the internal pressure attenuation time of the foamed beads, the foamed beads are first subjected to a pressurizing treatment with air to penetrate the foamed beads with the air, thereby applying a high internal pressure to the foamed beads to measure the time required to attenuate the internal pressure applied from 1.2 kgf/cm²(G) to 0.8 kgf/cm²(G). Specifically, the time is measured in accordance with the following method.

A plurality of foamed beads are first contained in a polyethylene bag of about the size of 70 mm×100 mm, in which many pores through which no foamed bead can pass, but air can freely pass have been bored with a needle. The foamed bead-containing bag is then pressurized with air in a closed vessel while holding the bag at 23° C., thereby applying an internal air pressure of 2 to 3 kgf/cm²(G) to the foamed beads. The bag was then taken out of the closed vessel into a thermostatic chamber controlled at 23° C. under atmospheric pressure, and immediately placed on a weigher to read its weight (regarding the time the weight is first read as the reference time). While the bag is placed on the weigher, the weight of the bag is read at intervals of 5 minutes until 2 hours elapse from the reference time, and at intervals of 30 minutes from after 2 hours from the reference time to after 48 hours from the reference time. Since the pressurized air within the foamed beads penetrates outside through the cell walls as the time goes on, the weight of the foamed beads reduces correspondingly and becomes substantially stabilized after 48 hours from the reference time because equilibrium is reached. All the foamed beads are taken out of the bag in the thermostatic chamber immediately after the weight measurement after 48 hours is completed to read the weight of the bag. In any case of the above process, the weight is read up to the decimal part of 0.0001 g. From the data thus obtained, a weight-time curve on the foamed beads is prepared with the weight (g) of the foamed beads plotted as ordinate against the time (min) as abscissa. Incidentally, the weight of the foamed beads as ordinate is a value obtained by subtracting the weight of the polyethylene bag from the weight of the foamed bead-containing bag.

The time, $t_{1.2}$ (min) until the weight of the foamed beads becomes a weight corresponding to the internal air pressure of 1.2 kgf/cm$^2$(G) and the time, $t_{0.8}$ (min) until the weight of the foamed beads becomes a weight corresponding to the internal air pressure of 0.8 kgf/cm$^2$(G) are read from the thus-obtained weight-time curve on the foamed beads. The thus-obtained $[t_{0.8}$ (min)$-t_{1.2}$ (min)$]$ is the "internal pressure attenuation time" referred to in the present invention. Incidentally, the internal air pressure, P [kgf/cm$^2$(G)] of the foamed beads is calculated out in accordance with the following equation (3):

$$P = (W \div M) \times R \times T \times Q \div V \quad (3)$$

The equation (3) is a version of the equation of state of gas, and the respective characters in the equation (3) are as follows:

W is an increased air weight (g) and means a difference between the weight of the foamed beads at each measuring time and the weight, S (g) of the foamed beads after 48 hours from the reference time. M is the molecular weight of air, and a constant of 28.8 (g) is adopted herein. R is a gas constant, and a constant of 0.082 (atm·l/K·mol) is adopted herein. T means an absolute temperature, and a constant thereof is 296 (°K), since an atmosphere at 23° C. is used. Q is a coefficient for converting the unit of the pressure from an atm unit to a kgf/cm$^2$ unit, and a coefficient of 1.0332 (kgf/cm$^2$/atm) is adopted herein. V means a volume (l) obtained by subtracting the volume of the base resin occupied in the foamed beads from the apparent volume of the foamed beads. Incidentally, the apparent volume (l) of the foamed beads is obtained by calculating out a volume, Y (cm$^3$) of the foamed beads from a graduation read at the time all the foamed beads taken out of the bag after 48 hours from the reference time are immersed in water within a graduated cylinder in which 100 cm$^3$ of water at 23° C. have been contained, and converting this volume to a liter (l) unit. The volume of base resin occupied in the foamed beads is obtained by dividing the volume, Y (cm$^3$) by an apparent expansion ratio (time) of the foamed beads and converting this value to a liter (l) unit. The apparent expansion ratio of the foamed beads is obtained by dividing the density, B (0.9 g/cm$^3$) of the base resin by an apparent density (g/cm$^3$) of the foamed beads. The apparent density (g/cm$^3$) of the foamed beads is obtained by dividing the weight, S (g) of the foamed beads by the volume, Y (cm$^3$).

In the above-described measurement, a plurality of foamed beads in such an amount that the weight, S of the foamed beads is 0.5000 to 10.0000 g, and the volume, Y thereof is 50 to 90 cm$^3$ are used.

Foamed beads having an internal pressure attenuation time shorter than 80 minutes provide molded foams, which take a long time to recover a molded foam obtained by molding such foamed beads in a mold or the like from shrinkage occurred in the molded foam right after the molding, or cannot be recovered from the shrinkage, in a high proportion, so that the fraction defective of the resulting molded foams is increased. From such a point of view, the internal pressure attenuation time is preferably at least 85 minutes, particularly at least 90 minutes.

When the CNI value of the foamed beads is not smaller than 3.80, the pressure of the steam necessary for molding must be increased, so that the object of the present invention cannot be achieved. Incidentally, when the CNI value is made 3.60 or smaller, the pressure of the steam necessary for molding may be more lowered, and is hence preferred. When the CNI value is too small, however, such foamed beads may involve such problems that they are easy to become an open-cell state by mechanical compression or the like, and a molded foam obtained from the foamed beads is easy to wrinkle at its surface after aging. Therefore, it is preferred that the lower limit of the CNI value be determined to be 2.00. Accordingly, the CNI value is preferably 2.00 to 3.60. Incidentally, the CNI value shows a greater value as the number of cells contained in a foamed bead increases, while the CNI value shows a smaller value as the number of cells thereof decreases.

Smaller foamed beads have a merit that the pressure of the steam upon molding can be lowered. If the foamed beads are too small, however, their expansion efficiency becomes poor. Therefore, the average weight of the foamed beads is preferably 0.1 to 4.0 mg, particularly 0.2 to 1.1 mg per foamed bead. If the average weight per foamed bead exceeds 4.0 mg, the molding of such foamed beads requires steam of a higher pressure, and the foamed beads have a possibility that the insulating property of the resulting molded foam may be deteriorated, and cells in the molded foam may be easy to be collapsed when it is mechanically compressed.

The foamed beads according to the present invention are preferably such that on a DSC curve obtained by the differential scanning calorimetry of the foamed beads, a high-temperature peak appears on the temperature side higher than a temperature at which an inherent peak corresponding to the heat of fusion of the base resin of the foamed beads appears, and the quantity of heat at the high-temperature peak is not lower than 10 J/g but lower than 15 J/g. If the quantity of heat at the high-temperature peak is lower than 10 J/g, the compressive strength, quantity of energy absorption or the like of the resulting molded foam are lowered, and moreover such a molded foam tends to be hard to recover from shrinkage occurred in the molded foam even when it is aged under heat after molding. If the quantity of heat at the high-temperature peak is not lower than 15 J/g on the other hand, such foamed beads have a possibility that it may take a longer time to apply an internal pressure to the foamed beads upon their molding. In the present invention, the foamed beads the quantity of heat at the high-temperature peak of which is 11 to 14 J/g are particularly preferred.

The quantity of heat at the high-temperature peak is a quantity of heat at a high-temperature peak b which appears on the temperature side higher than a temperature at which an inherent peak a inherent in the base resin appears on a DSC curve (shown in FIG. 1) obtained when heating 2 to 4 mg of the foamed beads from room temperature to 220° C. at a heating rate of 10° C./min by a differential scanning calorimeter, and corresponds to an area of the high-temperature peak b. The quantity of heat can be determined, for example, in the following manner. Namely, a straight line (α–β) is first drawn between a point α corresponding to 80° C. on the DSC curve and a point β on the DSC curve, which corresponds to the melting completion temperature, $T_E$ of the foamed beads. A line parallel to the ordinate axis of the graph is then drawn from a point y on the DSC curve, which corresponds to a valley between the inherent peak a and the high-temperature peak b, to regard an intersection of this line with the straight line (α–β) as δ. The area of the high-temperature peak b is an area of a section (a hatched section in FIG. 1) surrounded by a curve at the portion of the high-temperature peak b on the DSC curve, the line (δ–β) and a line (γ–δ).

Figure 2:
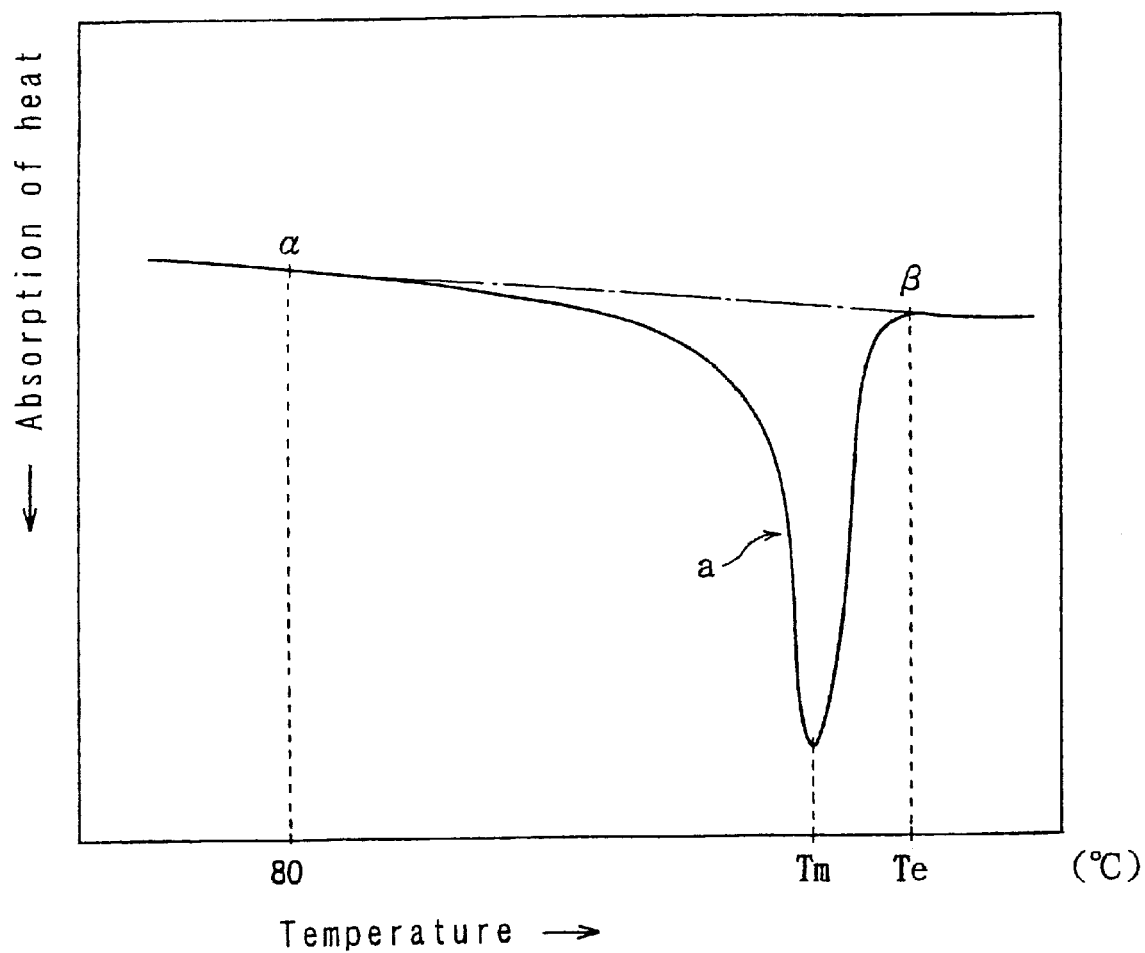
FIG. 2 shows an illustrative chart of a second DSC curve of the base resin of the foamed beads of the polypropylene resin.

The high-temperature peak b appears on the first DSC curve obtained by the above-described measurement. However, the high-temperature peak b does not appear on a second DSC curve obtained when cooling the foamed beads from 220° C. to about 40° C. at a cooling rate of 10° C./min once after the first DSC curve is obtained, and heating them again to 220° C. at a heating rate of 10° C./min. Only the inherent peak a inherent in the base resin appears on the second DSC curve similar to a DSC curve illustrated in FIG. 2.

The foamed beads according to the present invention generally have an expansion ratio of 3 to 100 times. Only a low-expansion molded article can be obtained from foamed beads having a low expansion ratio. However, both low-expansion molded article and high-expansion molded article can be obtained with ease from foamed beads having a high expansion ratio. From such a point of view, the expansion ratio of the foamed beads according to the present invention is preferably at least 30 times, more preferably at least 40 times. If the expansion ratio of the foamed beads becomes too high on the other hand, cells therein become liable to be collapsed. Therefore, the expansion ratio is preferably at most 90 times, more preferably at most 80 times. When the intended expansion ratio of a molded foam to be provided is not very high and is limited to a narrow range, the foamed beads used do not always require to have an expansion ratio of 30 times or higher.

For example, a publicly known method, in which particles of a polypropylene resin are dispersed together with a foaming agent in a dispersion medium such as water in a closed vessel and heated to soften the resin particles and impregnate the resin particles with the foaming agent, and the resin particles are then released from the vessel under a pressure lower than the internal pressure of the vessel at a temperature not lower than the softening temperature of the resin particles, thereby foaming and expanding the resin particles, may be applied to the production of the foamed beads according to the present invention. In this case, foamed beads the CNI value of which is smaller than 3.80 can be produced simply by controlling the cell diameter of the resulting foamed beads when an average weight per resin particle and the intended bulk expansion ratio of the foamed beads are determined in advance. The control of the cell diameter of the foamed beads is mainly made by using a cell-nucleus forming agent such as inorganic powder. However, the cell diameter can also be changed by changing a foaming temperature, the kind and amount of the foaming agent used, and the like. In order to achieve the intended cell diameter, it is therefore necessary to preset conditions by conducting a preliminary experiment. In order to impart a nature that the internal pressure attenuation time becomes at least 80 minutes to the resulting foamed beads, it is only necessary to produce the foamed beads under such conditions that the quantity of heat at the high-temperature peak on a DSC curve of the foamed beads becomes at least 8 J/g, preferably at least 10 J/g. The foamed beads having such a high- temperature peak can be obtained by a method in which upon dispersing the resin particles in the dispersion medium in the closed vessel to heat them in the publicly known method described above, the resin particles are heated to an optional heating temperature, Ta within a range of from not lower than [the melting point, $T_m$ of the resin particles–15° C.] to lower than the melting completion temperature, Te of the resin particles without heating the resin particles to the melting completion temperature, Te of the resin particles or higher, held at this temperature Ta for a sufficient period of time (preferably, about 10 to 60 minutes), then heated to an optional heating temperature, Tb within a range of from [the melting point, $T_m$–5° C.] to [the melting completion temperature, Te+5° C.] to hold them at that temperature, Tb for an additional sufficient period of time (preferably, about 10 to 60 minutes) if necessary, and then released from the vessel, thereby foaming and expanding them.

The quantity of heat at the high-temperature peak of the foamed beads mainly depends on the holding temperature, Ta and holding time at the temperature, Ta, the holding temperature, Tb and holding time at the temperature, Tb for the resin particles upon the production of the foamed beads, and a heating rate. The quantity of heat at the high-temperature peak of the foamed beads shows a tendency to increase as the temperature, Ta or Tb is lower within the above temperature range, the holding time is longer, and the heating rate is lower. A heating rate of 0.5 to 5° C./min is generally adopted. When the preliminary experiment is conducted repeatedly in view of these respects, the conditions for producing the foamed beads exhibiting the desired quantity of heat at the high-temperature peak can be known with ease.

Incidentally, the temperature ranges described above are proper temperature ranges in the case where an inorganic gas type foaming agent (hereinafter referred to as "inorganic foaming agent") is used as the foaming agent. Accordingly, when the foaming agent is changed to a volatile organic foaming agent (hereinafter referred to as "organic foaming agent"), the respective suitable temperature ranges are shifted on the temperature sides lower than the above temperature ranges according to the kind and amount of the organic foaming agent used.

The melting point, Tm means a temperature corresponding to a top of an inherent peak a appeared on a second DSC curve (illustrating an example thereof in FIG. 2) obtained by using 2 to 4 mg of the resin particles as a sample to conduct its differential scanning calorimetry in the same manner as the above-described method for obtaining the DSC curves of the foamed beads, while the melting completion temperature, Te means a temperature corresponding to a point on the temperature side higher than the temperature corresponding to the inherent peak a, at which the DSC curve is just returned from the top of the inherent peak a to a position of the base line(α–β).

As the foaming agent used in the above-described process, there may be generally used an organic foaming agent or an inorganic foaming agent, or a mixture thereof. Examples of the organic foaming agent include aliphatic hydrocarbons such as propane, butane, hexane and heptane, alicyclic hydrocarbons such as cyclobutane and cyclopentane, and halogenated hydrocarbons such as chlorofluoromethane, trifluoromethane, 1,1-difluoroethane, 1,2,2,2-tetrafluoroethane, methyl chloride, ethyl chloride and methylene chloride. These foaming agents may be used in any combination thereof. Examples of the inorganic foaming agent include nitrogen, carbon dioxide, argon and air. These foaming agents may be used in any combination thereof. When an organic foaming agent and an inorganic foaming agent are used in combination, compounds optionally selected from among the above-mentioned organic and inorganic foaming agents may be used in combination. Of these foaming agents, the inorganic foaming agents are preferred in that they cause no ozonosphere destruction and are cheap, with nitrogen, air and carbon dioxide being particularly preferred.

The amount of the foaming agent used is determined according to the expansion ratio of the foamed beads intended to obtain, and in view of the kinds of the base resin and foaming agent used. However, the amount is generally about 5 to 50 parts by weight for the organic foaming agent or about 0.5 to 30 parts by weight for the inorganic foaming agent, per 100 parts by weight of the resin.

The dispersion medium used in dispersing the resin particles therein is not limited to the water described above, and any medium may be used so far as it does not dissolve the resin particles. Examples of dispersion media other than water include ethylene glycol, glycerol, methanol and ethanol. In general, water is preferably used. A dispersing agent may be added to the dispersion medium upon dispersing the resin particles in the dispersion medium as needed. Examples of the dispersing agent include fine particles of aluminum oxide, titanium oxide, basic magnesium carbonate, basic zinc carbonate, calcium carbonate, kaolin, mica and clay. These dispersing agents are generally used in a proportion of 0.2 to 2 parts by weight per 100 parts by weight of the resin particles.

As the resin particles, there are used those composed of the above-described propylene random copolymer. However, any other propylene resins (for example, propylene block copolymers), ethylene resins such as high density polyethylene, medium density polyethylene, low density polyethylene, linear low density polyethylene, linear very low density polyethylene, ethylene-vinyl acetate copolymers, ethylene-acrylic acid copolymers and ethylene-methacrylic acid copolymers; styrene resins such as polystyrene and styrene-maleic anhydride copolymers; or other resins may be suitably blended for use with the propylene random copolymer so far as no detrimental influence is thereby imposed on the expected effects of the present invention.

Besides the above-mentioned resins, an elastomer such as ethylene-propylene rubber, ethylene-1-butene rubber, propylene-1-butene rubber, styrene-butadiene rubber or a hydrogenated product thereof, isoprene rubber, neoprene rubber, nitrile rubber, or styrene-butadiene block copolymer elastomer or a hydrogenated product thereof may be added. When the resins other than the propylene random copolymer, and/or the elastomers are blended with the propylene random copolymer, it is preferred that the amount of these resins and elastomers added be controlled to about 10 wt. % or less in total.

Various kinds of additives may be added to the resin particles. Examples of such additives include antioxidants, ultraviolet absorbents, antistatic agents, flame retardants, metal deactivators, pigments, dyes, crystal-nucleus forming agents, and cell-nucleus forming agents such as inorganic powders of zinc borate, talc, calcium carbonate, borax, aluminum hydroxide and the like. These additives may preferably be added in an amount of 20 parts by weight or less, particularly 5 parts by weight or less in total, per 100 parts by weight of the resin particles.

Incidentally, the foamed beads of the polypropylene resin obtained by the process described above can be converted into foamed beads having a higher expansion ratio by aging them under an atmospheric pressure, subjecting them to a pressurizing treatment with pressurized air to apply an internal pressure thereto and then heating them with steam or heated air.

A molded foam can be obtained by using a batch-wise molding process comprising filling the foamed beads, the internal pressure of which has been optionally raised, into a mold which can be heated and cooled, and hermetically closed and opened, supplying the mold with steam under a steam pressure of about 1.5 to 6.0 kgf/cm$^2$(G) to heat the foamed beads in the mold, thereby expanding and mutually fusion-bonding them, and then cooling the thus-obtained molded product to release it from the mold. A molded foam may also be produced by a continuous molding process comprising feeding the foamed beads, the internal pressure of which has been optionally raised, between belts which continuously move along the upper and lower sides within a passageway, respectively, expanding and mutually fusion-bonding the foamed beads while passing a steam heating region, causing the thus-obtained molded product to pass through a cooling region to cool it, and then taking the molded product out of the passageway to cut it into proper lengths (the molding process described in, for example, Japanese Patent Application Laid-Open Nos. 104026/1997, 104027/1997 and 180888/1998). Incidentally, in order to raise the internal pressure of the foamed beads, it is only necessary to place the foamed beads into a closed vessel and leave them to stand for a proper period of time in a state that pressurized air has been fed into the vessel, thereby penetrating the foamed beads with the air.

The molded foam produced in the above-described manner preferably has an open cell content of at most 40%, more preferably at most 30%, most preferably at most 25% as measure in accordance with Procedure C prescribed in ASTM D 2856-70. A molded foam having a lower open cell content has better mechanical strength.

The present invention will hereinafter be described in more detail by the following Examples.

EXAMPLES 1–3 AND COMPARATIVE EXAMPLES 1–3

In respective extruders, zinc borate (Zinc Borate 2335; product of Tomita Seiyaku K. K.) was added in their corresponding amounts shown in Table 1 to 100 parts by weight of a propylene-ethylene random copolymer (melting point: 146° C.; ethylene content: 2.3 wt. %; MFR measured under Conditions 14 of JIS K 7210: 10 g/10 min). Each of the mixtures was melted and kneaded in the extruder and extruded into a strand. The strand was quenched and then chopped by a pelletizer, thereby producing mini-pellets (resin particles).

In an autoclave, 100 parts by weight of the mini-pellets, 300 parts by weight of water as a dispersion medium, 0.3 parts by weight of kaolin as a dispersing agent, 0.006 parts by weight of sodium dodecylbenzene-sulfonate as a surfactant and carbon dioxide (dry ice) as a foaming agent in its corresponding amount shown in Table 1 were charged into an autoclave to close the autoclave. While stirring the contents in the autoclave, they were then heated at a heating rate of 2° C./min to its corresponding temperature (Ta) shown in Table 1 and held at the same temperature (Ta) for its corresponding period of time shown in Table 1. After the contents were then heated at a heating rate of 1° C./min to its corresponding temperature (Tb) shown in Table 1 and held at the same temperature (Tb) for its corresponding period of time shown in Table 1, a valve fitted to the bottom of the autoclave was opened to release the contents in the autoclave under atmospheric pressure to obtain foamed beads (one-stage foamed beads) according to each example. In this process, the release was conducted while introducing high-pressure air into the autoclave. After the one-stage foamed beads thus obtained were left to stand for 24 hours at ordinary temperature and atmospheric pressure, the expansion ratio thereof was measured. After its corresponding internal pressure shown in Table 1 was then applied to the foamed beads with pressurized air at ordinary temperature, steam of 0.6 kgf/cm²(G) was blown against the thus-treated foamed beads to obtain foamed beads (two-stage foamed beads) having a higher expansion ratio. After the thus-obtained two-stage foamed beads were left to stand for 24 hours at ordinary temperature and atmospheric pressure, the average weight (mg), bulk expansion ratio (time), quantity (J/g) of heat at the high-temperature peak, average cell diameter (mm) and internal pressure attenuation time (min) thereof were measured. Further, the CNI value thereof was found by calculation based on these data. These results are shown in Table 2.

After an internal pressure of 1.2 kgf/cm²(G) was then applied to the two-stage foamed beads using pressurized air at ordinary temperature, they were immediately filled into a mold having inside dimensions of 300 mm×300 mm×60 mm and preheated with steam under a steam pressure lower than a steam pressure upon heating for molding by 0.4 to 0.8 kgf/cm²(G). Steam of its corresponding pressure shown in Table 2 (in Table 2, expressed as "Minimum steam pressure") was then introduced into the mold to heat the foamed beads for molding. The thus-obtained molded product was aged for 24 hours at 60° C. and atmospheric pressure. Incidentally. the term "minimum steam pressure" as used herein means a minimum steam pressure required to obtain a molded product which has good appearance (being little in voids on the surface thereof), undergoes little shrinkage (the volume of the molded product after aging being at least 90% of the internal volume of the mold) and is high in the degree of fusion bonding among the foamed beads (the proportion of non-interbead breakage at its rupture cross-section being at least 60% as determined by pulling a specimen 10 mm in thickness, 30 mm in width and 100 mm in length, which has been cut out of the molded product, at a crosshead speed of 500 mm/min by a tensile tester to break it and observing the rupture cross-section).

TABLE 1

|  | Amount of zinc borate added (parts by weight) | Amount of foaming agent added (parts by weight) | Ta (° C.) | Ta (min) | Tb (° C.) | Tb (min) | Bulk expansion ratio of one-stage foamed beads (time) | Internal air pressure of one-stage foamed beads (kgf/cm²(G)) |
|---|---|---|---|---|---|---|---|---|
| Ex. 1 | 0.05 | 4.5 | 149 | 15 | 154 | 15 | 23 | 3.6 |
| Ex. 2 | 0.05 | 4.0 | 149.5 | 15 | 154.5 | 15 | 22 | 3.4 |
| Ex. 3 | 0.05 | 5.0 | 147.5 | 15 | 152.5 | 15 | 23 | 3.4 |
| Ex. 4 | 0.05 | 4.0 | 149.5 | 15 | 154.5 | 15 | 22 | |
| Comp. Ex. 1 | 0.05 | 5.5 | 147 | 15 | 152 | 15 | 23 | 3.8 |
| Comp. Ex. 2 | 0.05 | 5.0 | 148 | 15 | 153 | 15 | 24 | 3.6 |
| Comp. Ex. 3 | 0.05 | 4.5 | 149 | 15 | 154 | 15 | 22 | 3.4 |

TABLE 2

|  | Average bead weight (mg) | Bulk expansion ratio (time) | Quantity of heat at high-temperature peak (J/g) | Average cell diameter (mm) | CNI value | Internal pressure*[1] attenuation time (min) | Minimum steam pressure (kgf/cm²(G)) |
|---|---|---|---|---|---|---|---|
| Ex. 1 | 2.0 | 50 | 15 | 0.207 | 3.75 | 115 | 2.6 |
| Ex. 2 | 0.8 | 42 | 13 | 0.240 | 3.08 | 107 | 2.2 |
| Ex. 3 | 0.8 | 40 | 17 | 0.187 | 3.39 | 100 | 2.4 |
| Ex. 4 | 0.8 | 22 | 13 | 0.194 | 3.08 | 160 | 2.2 |
| Comp. Ex. 1 | 2.0 | 48 | 18 | 0.161 | 4.06 | 65 | 3.0 |
| Comp. Ex. 2 | 2.5 | 52 | 16 | 0.201 | 3.90 | 185 | 3.0 |
| Comp. Ex. 3 | 3.0 | 51 | 15 | 0.185 | 4.08 | 190 | 3.0 |

*[1]The internal pressure attenuation time is the time until the internal pressure applied to the foamed beads with air lowers from 1.2 kgf/cm²(G) to 0.8 kgf/cm(G) under atmospheric pressure at 23° C.

EXAMPLE 4

One-stage foamed beads were produced in the same manner as in Example 2. After the one-stage foamed beads thus obtained were left to stand for 24 hours at ordinary temperature and atmospheric pressure, the average weight (mg), bulk expansion ratio (time), quantity (J/g) of heat at the high-temperature peak, average cell diameter (mm) and internal pressure attenuation time (min) thereof were measured. Further, the CNI value thereof was found by calculation based on these data. These results are shown in Table 2.

After an internal pressure of 0.8 kgf/cm$^2$(G) was then applied to the one-stage foamed beads using pressurized air at ordinary temperature, they were immediately filled into a mold having inside dimensions of 300 mm×300 mm×60 mm and preheated with steam under a steam pressure lower than the steam pressure upon heating for molding by 0.4 to 0.8 kgf/cm$^2$(G). Steam of its corresponding "minimum steam pressure" shown in Table 2 was then introduced into the mold to heat the foamed beads for molding. The thus-obtained molded product was aged for 24 hours at 60° C. and atmospheric pressure.

As described above, the foamed beads according to the present invention can provide molded foams excellent in mechanical properties because the foamed beads comprise, as a base resin, an uncrosslinked propylene random copolymer having a melting point as high as at least 140° C. In addition, the foamed beads according to the present invention permit the provision of molded foams excellent in the fusion-bonded state of the foamed beads, and little in or free of interbead voids and hence good in appearance, though the base resin has a higher melting point, even when they are heated with lower-pressure steam compared with the conventional foamed beads comprising, as a base resin, an uncrosslinked polypropylene resin having the same melting point. Further, the foamed beads according to the present invention permit molding using low-pressure steam, so that the energy cost of the steam for molding the foamed beads can be reduced, and moreover the molding cycle can also be shortened, resulting in improvement of productivity.

What is claimed is:

1. Foamed and expanded beads of a polypropylene resin for molding, which comprise an uncrosslinked propylene-ethylene random copolymer having a melting point of at least 140° C. as a base resin, wherein the time required to attenuate an air pressure within the foamed and expanded beads applied by a pressurizing treatment with air from 1.2 kgf/cm$^2$(G) to 0.8 kgf/cm$^2$(G) under atmospheric pressure at 23° C. is at least 80 minutes, and the CNI value of the foamed and expanded beads, which is defined by the following equation (1):

$$CNI = \log_{10}(Pw \times Er \div (2.24 \times D^3 \times B)) \quad (1)$$

wherein Pw is an average weight (mg) per foamed and expanded bead, Er is a bulk expansion ratio (time) of the foamed and expanded beads, D is a cell diameter (mm) of the foamed and expanded beads, and B is a density of the base resin, is 2.00–3.6, and the foamed and expanded beads have an average weight of at least 0.2 mg but at most 1.1 mg per foamed and expanded bead and a bulk expansion ratio of 22 to 80 times, and wherein on a DSC curve obtained by the differential scanning calorimetry of the foamed and expanded beads, a high-temperature peak appears on the temperature side higher than a temperature at which an inherent peak corresponding to the heat of fusion of the base resin of the foamed and expanded beads appears, and the quantity of heat at the high-temperature peak is not lower than 10 J/g but lower than 17 J/g.

2. The foamed and expanded beads according to claim 1, wherein the uncrosslinked propylene-ethylene random copolymer, which is the base resin of the foamed and expanded beads, is a propylene-ethylene random copolymer containing an ethylene component in a proportion of 0.5 to 15 wt. %.

3. The foamed and expanded beads according to claim 1, wherein the melting point of the uncrosslinked propylene-ethylene random copolymer, which is the base resin of the foamed and expanded beads, is at least 140° C. but at most 160° C.

4. The foamed and expanded beads according to claim 1, wherein the melt flow rate of the uncrosslinked propylene-ethylene random copolymer, which is the base resin of the foamed and expanded beads, is 0.5 to 12 g/10 min.

5. The foamed and expanded beads according to claim 1, wherein on a DSC curve obtained by the differential scanning calorimetry of the foamed and expanded beads, a high-temperature peak appears on the temperature side higher than a temperature at which an inherent peak corresponding to the heat of fusion of the base resin of the foamed and expanded beads appears, and the quantity of heat at the high-temperature peak is not lower than 10 J/g but lower than 15 J/g.

6. The foamed and expanded beads according to claim 1, wherein the bulk expansion ratio of the foamed and expanded beads is 40 to 80 times.

7. Foamed and expanded beads of a polypropylene resin for molding, which comprise an uncrosslinked propylene-ethylene random copolymer having a melting point of at least 140° C. as a base resin, wherein the time required to attenuate an air pressure within the foamed and expanded beads applied by a pressurizing treatment with air from 1.2 kgf/cm$^2$(G) to 0.8 kgf/cm$^2$(G) under atmospheric pressure at 23° C. is at least 80 minutes, the CNI value of the foamed and expanded beads, which is defined by the following equation (1):

$$CNI = \log_{10}(Pw \times Er \div (2.24 \times D^3 \times B)) \quad (1)$$

wherein Er is an average weight (mg) per foamed and expanded bead, Er is a bulk expansion ratio (time) of the foamed and expanded beads, D is a cell diameter (mm) of the foamed and expanded breads, and B is a density of the base resin, is 2.00 to 3.60, and the foamed and expanded beads have an average weight of at least 0.2 mg but at most 1.1 mg per foamed and expanded bead and a bulk expansion ratio of 40 to 80 times, and wherein on a DSC curve obtained by the differential scanning calorimetry of the foamed and expanded beads, a high-temperature peak appears on the temperature side higher than a temperature at which an inherent peak corresponding to the heat of fusion of the base resin of the foamed and expanded beads appears, and the quantity of heat at the high-temperature peak is not lower than 10 J/g but lower than 15 J/g.

8. The foamed and expanded polypropylene resin for molding according to claim 1, wherein the value of CNI is 2.00–3.39.

9. The foamed and expanded beads of a polypropylene resin for molding according to claim 1, wherein the quantity of heat at the high-temperature peak is 11–14 J/g.

10. The foamed and expanded beads of a polypropylene resin for molding according to claim 7, wherein the uncrosslinked propylene-ethylene random copolymer which is the base resin of the foamed and expanded beads is a propylene-ethylene random copolymer containing an ethylene component in a proportion of 0.05 to 15 wt. %.

11. The foamed and expanded beads of a polypropylene resin for molding according to claim 7, wherein the melting point of the uncrosslinked propylene-ethylene random copolymer which is the base resin of the foamed and expanded beads is higher than 140° C. and lower than 160° C.

12. The foamed and expanded beads of a polypropylene resin for molding according to claim 7, wherein the melt flow rate of the uncrosslinked ethylene-propylene random block copolymer, which is the base resin of the foamed and expanded beads, is 0.5 to 12 g/10 min.

13. The foamed and expanded beads of a polypropylene resin for molding according to claim 7, wherein the value of CNI is 2.00–3.39.

14. The foamed and expanded beads of a polypropylene resin for molding according to claim 7, wherein the quantity of heat at the high-temperature peak is 11–14 J/g.

* * * * *